United States Patent
Wang et al.

(10) Patent No.: US 12,296,405 B2
(45) Date of Patent: May 13, 2025

(54) LASER WELDING DEVICE WITH CHANGING FOCAL POSITION AND LASER WELDING METHOD USING SAME

(71) Applicant: Panasonic Intellectual Property Management Co., Ltd., Osaka (JP)

(72) Inventors: Jingbo Wang, Hyogo (JP); Masatoshi Nishio, Osaka (JP); Kenzo Shibata, Hyogo (JP); Manabu Nishihara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 756 days.

(21) Appl. No.: 17/541,166

(22) Filed: Dec. 2, 2021

(65) Prior Publication Data
US 2022/0088709 A1 Mar. 24, 2022

Related U.S. Application Data

(63) Continuation of application No. PCT/JP2020/021951, filed on Jun. 3, 2020.

(30) Foreign Application Priority Data

Jun. 5, 2019 (JP) .................... 2019-105529

(51) Int. Cl.
*B23K 26/21* (2014.01)
(52) U.S. Cl.
CPC .................... *B23K 26/21* (2015.10)
(58) Field of Classification Search
CPC .. B23K 26/21; B23K 26/046; B23K 26/0884; B23K 26/242; B23K 26/244; B23K 26/26; B23K 26/082
See application file for complete search history.

(56) References Cited

U.S. PATENT DOCUMENTS

2008/0161964 A1 7/2008 Irie et al.
2011/0297654 A1* 12/2011 Yoshikawa .......... B23K 26/046
219/121.81

(Continued)

FOREIGN PATENT DOCUMENTS

CN 105414759 3/2016
JP 3-210980 9/1991

(Continued)

OTHER PUBLICATIONS

International Search Report of PCT application No. PCT/JP2020/021951 dated Aug. 4, 2020.

(Continued)

*Primary Examiner* — John P. Dulka
(74) *Attorney, Agent, or Firm* — Wenderoth, Lind & Ponack, L.L.P.

(57) ABSTRACT

Laser welding device (1000) includes: laser oscillator (100); optical fiber (300) that transmits a laser beam (LB) generated in laser oscillator (100); laser beam emitting head (400) that is attached to the emission end of optical fiber (300) and emits laser beam (LB) toward workpiece (600); manipulator (500) with laser beam emitting head (400) attached thereto; and controller (200) that controls laser beam emitting head (400) so as to cause laser beam (LB) to be scanned three-dimensionally on the surface of workpiece (600). Controller (200) controls laser beam emitting head (400) so as to change a focal position of laser beam (LB) in accordance with a shape of a welded portion in workpiece (600).

14 Claims, 11 Drawing Sheets

(56) References Cited

U.S. PATENT DOCUMENTS

2016/0332257 A1* 11/2016 Kawamoto .......... B23K 26/082
2018/0009060 A1*  1/2018 Yang .................. B23K 26/0626
2018/0221989 A1   8/2018 Matsuoka et al.
2018/0361507 A1  12/2018 Hioki et al.
2019/0176270 A1*  6/2019 Hara .................. B23K 26/1464
2021/0046585 A1   2/2021 Hioki et al.

FOREIGN PATENT DOCUMENTS

| JP | 2003-136262 | 5/2003 |
| JP | 2006-187803 | 7/2006 |
| JP | 2011-173146 | 9/2011 |
| JP | 2014-213374 | 11/2014 |
| JP | 2019-000878 | 1/2019 |

OTHER PUBLICATIONS

Extended European Search Report issued Jul. 14, 2022 in corresponding European Patent Application No. 20819107.2.

* cited by examiner

LASER WELDING DEVICE WITH CHANGING FOCAL POSITION AND LASER WELDING METHOD USING SAME

This application is a continuation of the PCT International Application No. PCT/JP2020/021951 filed on Jun. 3, 2020, which claim the benefit of foreign priority of Japanese patent application No. 2019-105529 filed on Jun. 5, 2019, the contents all of which are incorporated herein by reference.

TECHNICAL FIELD

The present disclosure relates to a laser welding device and a laser welding method using the same.

BACKGROUND ART

In recent years, remote welding for performing welding at high speed by emitting a laser beam toward a workpiece via a scanner attached to a robot has been widely performed (e.g., see Patent Literature 1). A long-focus condensing lens is mounted on the scanner.

In the remote welding using such a scanner, the laser beam can be three-dimensionally scanned on the surface of the workpiece, so that the workpiece having a complicated shape can be welded (e.g., see Patent Literatures 2 and 3).

In addition, a configuration has been proposed in which not only the laser beam is scanned three-dimensionally but also the focal position of the laser beam is periodically controlled (e.g., see Patent Literature 3).

CITATION LIST

Patent Literature

PTL 1: Unexamined Japanese Patent Publication No. 2006-187803
PTL 2: Unexamined Japanese Patent Publication No. 2011-173146
PTL 3: US 2018/009060 A1

SUMMARY OF THE INVENTION

Technical Problem

In a case where laser welding is performed on a predetermined region in a workpiece while a laser beam is scanned three-dimensionally, a conventional method of adjusting the focal position of the laser beam only on a surface of the workpiece may be insufficient in ensuring bonding strength of a welded portion. In particular, this tendency is remarkable when the shape of the welded portion in the workpiece is complicated. In such a case, a portion where a desired penetration shape cannot be obtained is generated in the welded portion, and there is a possibility that the bonding strength cannot be ensured. In addition, the outer appearance of the welded portion may be impaired by the occurrence of spatter or the like, and the welding quality may deteriorate.

However, the conventional configurations disclosed in PTL 1 to 3 do not specifically describe the focal position control of the laser beam in accordance with the shape of the welded portion.

The present disclosure has been made in view of such a point, and an object of the present disclosure is to provide a laser welding device capable of controlling a penetration shape in accordance with a shape of a welded portion in a workpiece and a laser welding method using the laser welding device.

Solution to Problem

In order to achieve the above object, a laser welding device according to the present disclosure at least includes: a laser oscillator that generates a laser beam; an optical fiber that transmits the laser beam generated in the laser oscillator; a laser beam emitting head that is attached to the emission end of the optical fiber and emits the laser beam incident from the optical fiber toward a workpiece; a manipulator to which the laser beam emitting head is attached, and that moves the laser beam emitting head along a predetermined trajectory; and a controller that controls the laser beam emitting head so as to cause the laser beam to be scanned two-dimensionally or three-dimensionally on the surface of the workpiece. The controller controls the laser beam emitting head or the manipulator so as to change a focal position of the laser beam illuminated on the workpiece in accordance with a shape of a welded portion in the workpiece.

With this configuration, the penetration shape of the workpiece can be controlled in accordance with the shape of the welded portion in the workpiece. In addition, the bonding strength of the workpiece can be increased.

A laser welding method according to the present disclosure is a laser welding method using the laser welding device, the method at least including a laser welding step of emitting the laser beam toward the workpiece while scanning the laser beam two-dimensionally or three-dimensionally to weld the workpiece. In the laser welding step, the focal position of the laser beam is changed in accordance with a shape of a welded portion in the workpiece, and a molten pool and a keyhole are formed in the workpiece.

According to this method, the penetration depth of the workpiece can be controlled in accordance with the shape of the welded portion in the workpiece. In addition, the bonding strength of the workpiece can be increased.

Advantageous Effect of Invention

According to the laser welding device and the laser welding method of the present disclosure, the penetration shape and the penetration depth of the workpiece can be controlled in accordance with the shape of the welded portion in the workpiece. In addition, the bonding strength of the workpiece can be increased.

DESCRIPTION OF EMBODIMENTS

Hereinafter, exemplary embodiments of the present disclosure will be described in detail with reference to the drawings. The following description of preferred exemplary embodiments is merely illustrative in nature and is not intended to limit the present disclosure, application, or uses.

First Exemplary Embodiment

[Configuration of Laser Welding Device]

Figure 1:
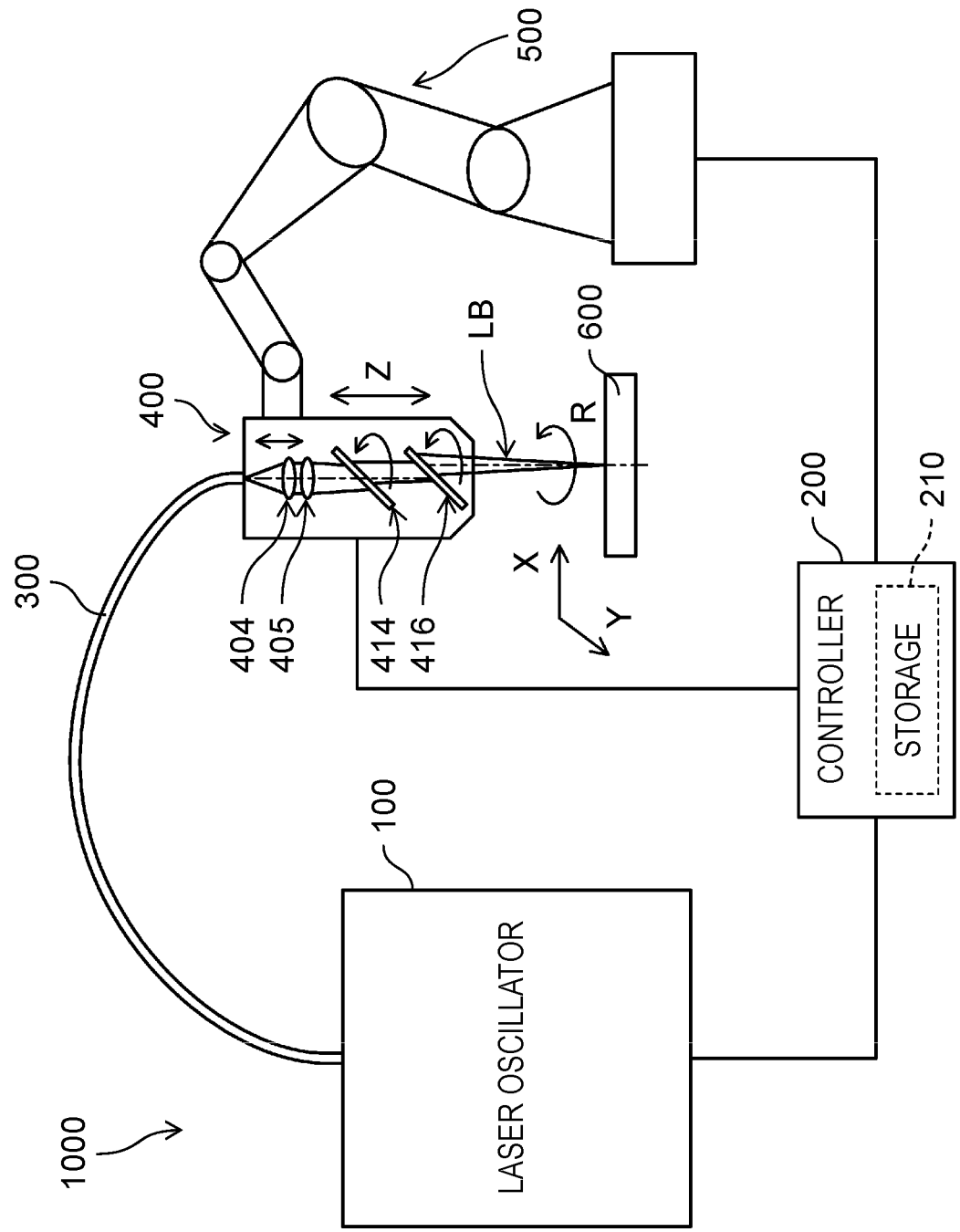
FIG. 1 is a schematic diagram illustrating a configuration of a laser welding device according to a first exemplary embodiment of the present disclosure.

FIG. 1 is a schematic diagram of a configuration of a laser welding device according to the present exemplary embodiment, and laser welding device 1000 includes laser oscillator 100, controller 200, optical fiber 300, laser beam emitting head 400, and manipulator 500.

Laser oscillator 100 is a laser light source that is supplied with power from a power supply (not illustrated) and generates laser beam LB. Laser oscillator 100 may include a single laser light source or may include a plurality of laser modules. In the latter case, laser beams emitted from the plurality of laser modules are combined and emitted as laser beam LB. A laser light source or a laser module used in laser oscillator 100 is appropriately selected in accordance with a material of workpiece 600 as an object to be welded, a shape of a welded portion, and the like.

For example, a fiber laser or a disk laser, or an yttrium aluminum garnet (YAG) laser can be used as the laser light source. In this case, the wavelength of laser beam LB is set in a range of 1000 nm to 1100 nm. The semiconductor laser may be used as the laser light source or the laser module. In this case, the wavelength of laser beam LB is set in a range of 800 nm to 1000 nm. A visible-light laser may be used as the laser light source or the laser module. In this case, the wavelength of laser beam LB is set in a range of 400 nm to 800 nm.

Optical fiber 300 is optically coupled to laser oscillator 100, has a core (not illustrated) at the axial center, and is provided with a first cladding (not illustrated) coaxially with the core in contact with the outer peripheral surface of the core. Each of the core and the first cladding contains quartz as a main component, and the refractive index of the core is higher than the refractive index of the first cladding. Thus, laser beam LB generated in laser oscillator 100 is incident on the incident end of optical fiber 300 and transmitted toward the emission end inside the core. A film or a resin-based protective layer (neither is illustrated) for mechanically protecting optical fiber 300 is provided on the outer peripheral surface of the first cladding.

Laser beam emitting head 400 is attached to the emission end of optical fiber 300 and emits laser beam LB transmitted through optical fiber 300 toward workpiece 600 to laser-weld workpiece 600.

Laser beam emitting head 400 is configured to scan laser beam LB two-dimensionally or three-dimensionally and emit laser beam LB toward workpiece 600, and includes optical scanning mechanism 424 (cf. FIG. 2) that scans laser beam LB. Further, laser beam emitting head 400 includes focal position adjustment mechanism 407 (cf. FIG. 2) for changing the focal position of laser beam LB emitted toward workpiece 600. Details and functions of the structures of laser beam emitting head 400, optical scanning mechanism 424, and focal position adjustment mechanism 407 will be described later.

Controller 200 controls laser oscillation of laser oscillator 100. Specifically, the laser oscillation is controlled by supplying control signals for an output current, an on-time, an off-time, and the like to a power supply (not illustrated) connected to laser oscillator 100.

Further, controller 200 controls the driving of optical scanning mechanism 424 and focal position adjustment mechanism 407 provided in laser beam emitting head 400 in accordance with the content of a selected laser welding program. Controller 200 controls the operation of manipulator 500.

The laser welding program is stored in storage 210. Storage 210 may be provided inside controller 200 as illustrated in FIG. 1, or may be provided outside controller 200 and configured to exchange data with controller 200. Storage 210 stores data in which the focal position of laser beam LB and the penetration depth of workpiece 600 are associated with the material of workpiece 600 (cf. FIG. 4).

Manipulator 500 is connected to controller 200 and moves laser beam emitting head 400 so as to draw a predetermined trajectory in accordance with the laser welding program described above. Controller 200 that controls the operation of manipulator 500 may be provided separately.

In the following description, a direction parallel to the optical axis of laser beam LB emitted from laser beam emitting head 400 may be referred to as a Z-direction, a direction orthogonal to the Z-direction may be referred to as an X-direction, and a direction orthogonal to the X-direction and the Z-direction may be referred to as a Y-direction. When the surface of workpiece 600 is a flat surface, an X-Y plane including the X-direction and the Y-direction therein may be substantially parallel to the surface and may have a constant angle.

In the specification of the present application, "substantially parallel" means parallel including machining tolerance of each member and assembly tolerance of each component, and does not require that two surfaces or members are at positions strictly parallel to each other. Similarly, "substantially orthogonal" means orthogonal including machining tolerance of each member and assembly tolerance of each component, and does not require that two surfaces or members are strictly orthogonal to each other. "Substantially the same" or "substantially identical" means the same or identical including manufacturing tolerance and assembly tolerance of each component, and does not require that both targets to be compared are strictly the same or identical. In addition, "substantially the same" or "substantially identical" is also used to mean that control results of objects to be controlled are the same or identical including an error of a control system.

[Configuration of Laser Beam Emitting Head]

Figure 2:
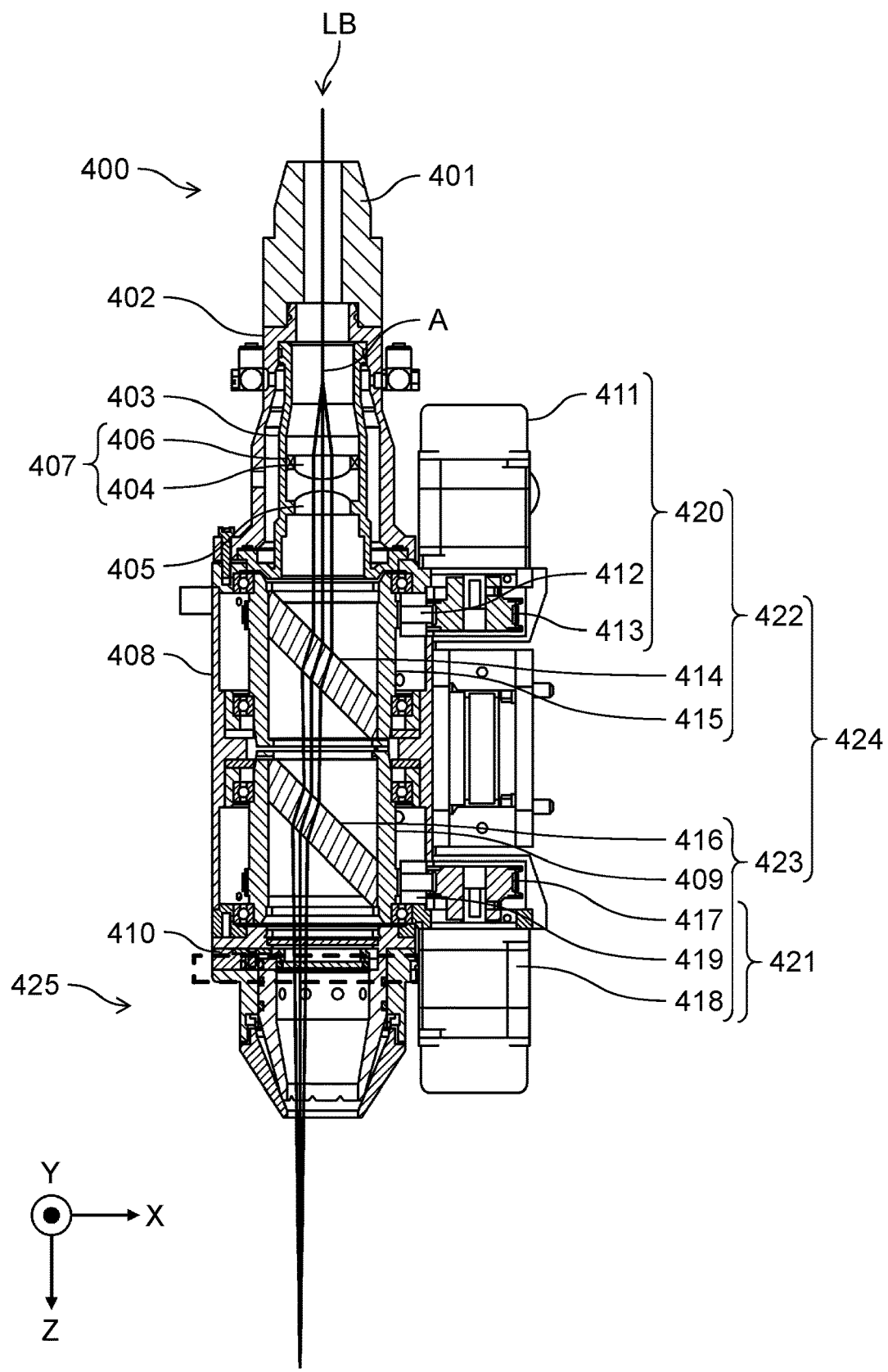
FIG. 2 is a schematic cross-sectional view illustrating a configuration of a laser beam emitting head.

FIG. 2 illustrates the configuration of the laser beam emitting head according to the present exemplary embodiment, and laser beam emitting head 400 includes connector 401, lens body 402, body case 408 (first case), shield holder 410, nozzle unit 425 (second case), first servomotor 411, and second servomotor 418. Shield holder 410 is detachably attached to nozzle unit 425, and in other configurations, a plurality of components may be integrated.

Laser beam emitting head 400 is connected to optical fiber 300 via connector 401. Laser beam LB is emitted into laser beam emitting head 400 while spreading at a certain angle from the emission end (corresponding to point A illustrated in FIG. 2) of optical fiber 300. Lens body 402 holds lens holder 403 in which collimating lens 404 and condensing lens 405 are accommodated. Collimating lens 404 collimates laser beam LB emitted from the emission end of optical fiber 300. Laser beam LB collimated by collimating lens 404 is condensed by condensing lens 405 so as to be focused on the surface or the inside of workpiece 600. Lens body 402 and the lens holder 403 determine an optical positional relationship between the emission end of optical fiber 300 and collimating lens 404.

Collimating lens 404 is held by slider 406 connected to an actuator (not illustrated) and accommodated in the lens holder 403. Although not illustrated in detail, the actuator moves collimating lens 404 held by slider 406 in the direction of the optical axis of laser beam LB emitted from laser beam emitting head 400, that is, in the Z-direction, in response to a control signal from controller 200. This leads to a change in the focal position of laser beam LB illuminated on workpiece 600. In the present specification, collimating lens 404, slider 406, and an actuator (not illustrated) may be referred to as focal position adjustment mechanism 407. The actuator may be a servomotor or another type of actuator. The actuator preferably has high responsiveness and is light in weight and small in size.

Body case 408 is provided with first rotation mechanism 420, first parallel plate 414, and first holder 415, which constitute first optical unit 422. First rotation mechanism 420 includes first servomotor 411 (first drive unit), first timing belt 412 (first transmission member), and first timing belt pulley 413 (first rotation member). First parallel plate 414 is fixed in first holder 415 having a cylindrical shape, both ends of which are held by bearings. First timing belt pulley 413 is provided on the outer peripheral surface of the first holder 415, and the first holder 415 is rotated by first servomotor 411 via first timing belt 412. Specifically, first holder 415 is rotated about a first rotation axis, and the direction of the first rotation axis is the same as the direction of the optical axis of laser beam LB emitted from laser beam emitting head 400, that is, the Z-direction.

Furthermore, body case 408 is provided with second rotation mechanism 421, second parallel plate 416, and second holder 409, which constitute second optical unit 423. Second rotation mechanism 421 includes second servomotor 418 (second drive unit), second timing belt 419 (second transmission member), and second timing belt pulley 417 (second rotation member). Second parallel plate 416 is fixed in second holder 409 having a cylindrical shape, both ends of which are held by bearings. Second timing belt pulley 417 is provided on the outer peripheral surface of second holder 409, and second holder 409 is rotated by second servomotor 418 via second timing belt 419. Specifically, second holder 409 is rotated about a second rotation axis, and the direction of the second rotation axis is the same as the Z-direction. In the present specification, first optical unit 422 and second optical unit 423 may be collectively referred to as optical scanning mechanism 424.

First optical unit 422 and second optical unit 423 have the first rotation axis and the second rotation axis in the same direction and are symmetrically disposed in body case 408. That is, first optical unit 422 and second optical unit 423 are disposed symmetrically with respect to a plane perpendicular to the first rotation axis and the second rotation axis. In FIG. 2, first optical unit 422 and second optical unit 423 are disposed vertically symmetrically. With this placement, when first servomotor 411 and second servomotor 418 rotate in the same direction, the rotation direction of first parallel plate 414 and the rotation direction of second parallel plate 416 are reversed. By reversing the rotation direction of first servomotor 411 that drives first parallel plate 414, the rotation direction of first parallel plate 414 and the rotation direction of second parallel plate 416 can be rotated in the same direction.

From the viewpoint of reducing the size of laser beam emitting head 400 and widening the laser illumination range of laser beam emitting head 400, first optical unit 422 and second optical unit 423 are preferably disposed so that the first rotation axis and the second rotation axis coincide with each other. The directions of the first rotation axis and the second rotation axis are preferably the same as the direction of the optical axis of laser beam LB when laser beam LB is incident from optical fiber 300. Furthermore, it is more preferable that the first rotation axis and the second rotation axis coincide with the optical axis of laser beam LB when laser beam LB is incident from optical fiber 300.

Laser beam LB having passed through collimating lens 404 and condensing lens 405 is refracted twice (when incident on first parallel plate 414 and when emitted from first parallel plate 414) at the time of passing through first parallel plate 414. As a result, laser beam LB is shifted in parallel by an amount determined by the plate thickness of first parallel plate 414, the inclination angle of first parallel plate 414, which is the attachment angle of first parallel plate 414 with respect to the first rotation axis, and the refractive index of first parallel plate 414. That is, the optical axis (first optical axis) of laser beam LB incident on first parallel plate 414 and the optical axis (second optical axis) of laser beam LB emitted from first parallel plate 414 extend in the same direction but are shifted from each other. The same holds true for second parallel plate 416 having a similar configuration. That is, the optical axis (second optical axis) of laser beam LB incident on second parallel plate 416 and the optical axis (third optical axis) of laser beam LB emitted from second parallel plate 416 extend in the same direction but are shifted from each other. Each of first parallel plate 414 and second parallel plate 416 of the present exemplary embodiment is made of synthetic quartz and has an inclination angle of 45° with respect to the first rotation axis (second rotation axis) and a refractive index of 1.44963. When plate thickness t of each of first parallel plate 414 and second parallel plate 416 is determined, the shift amount of laser beam LB can be calculated. For example, when t=13 mm, the optical axis (second optical axis) of laser beam LB transmitted through first parallel plate 414 is shifted by 4.1 mm. Similarly, when laser beam LB passes through second parallel plate 416 also, the optical axis (third optical axis) of laser beam LB is shifted by 4.1 mm. Therefore, the operation range of laser beam LB according to the present exemplary embodiment is in a circle with a radius of 8.2 mm.

The plate thicknesses and refractive indexes of first parallel plate 414 and second parallel plate 416 can be appropriately changed in accordance with the wavelength of laser beam LB, required processing conditions, and the like, and in that case, the scanning range of laser beam LB can also be changed.

According to the present exemplary embodiment, the optical axis of laser beam LB can be rotated with a predetermined radius around the original optical axis, and workpiece 600 can be illuminated with laser beam LB in various shapes, for example, an arc shape, a spiral shape, or a linear shape. That is, laser beam emitting head 400 is configured to scan laser beam LB two-dimensionally or three-dimensionally on the surface of workpiece 600 by a control signal from controller 200.

[Regarding Focal Position Control of Laser Beam at Time of Laser Welding]

Figure 3A:
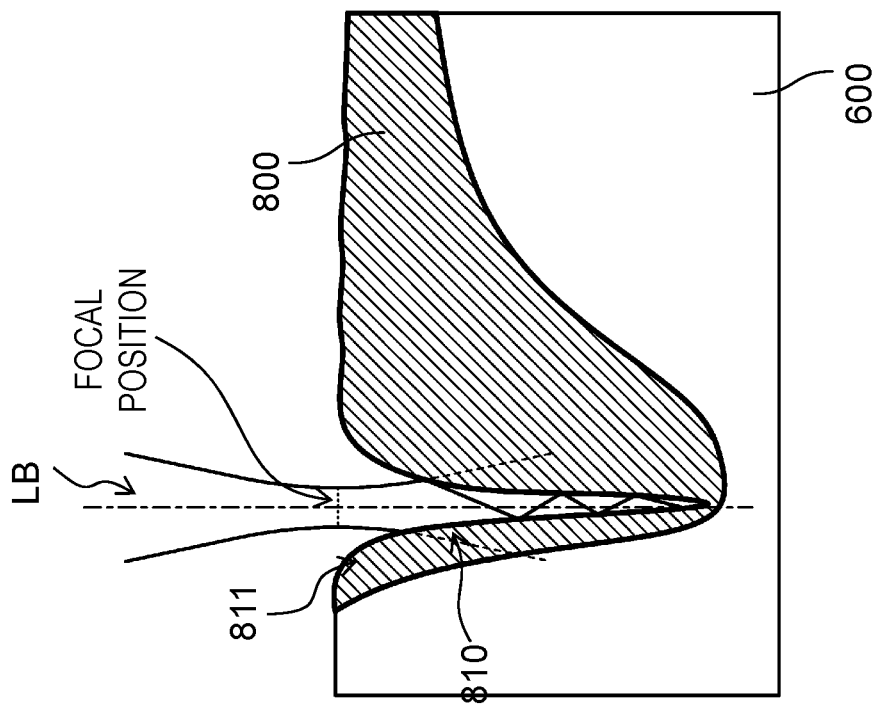
FIG. 3A is a schematic diagram illustrating a relationship between a molten pool and a keyhole formed in a workpiece and a focal position of a laser beam.
Figure 3B:
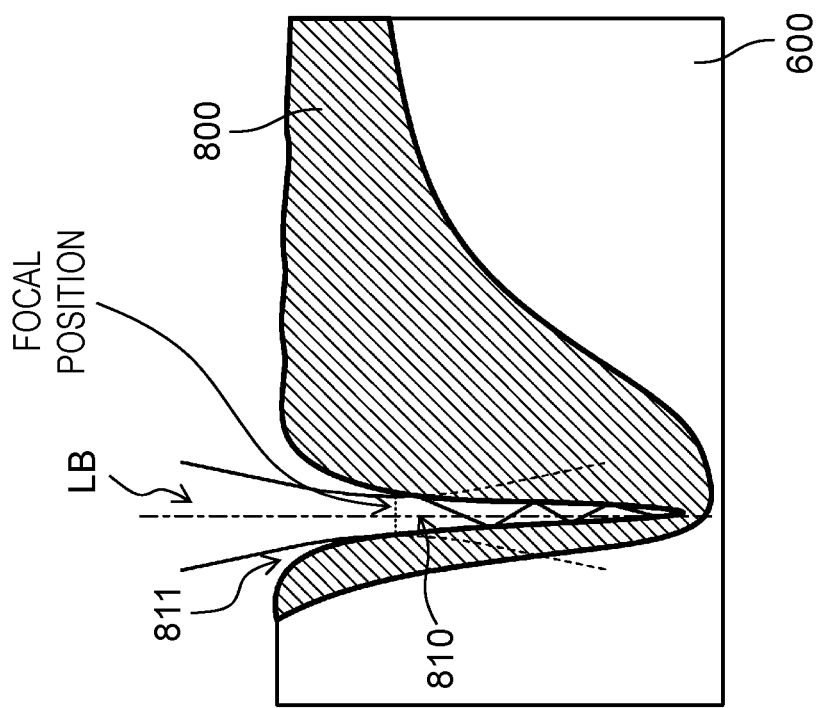
FIG. 3B is a schematic diagram illustrating a relationship between a molten pool and a keyhole formed in a workpiece and a focal position of a laser beam.
Figure 4:
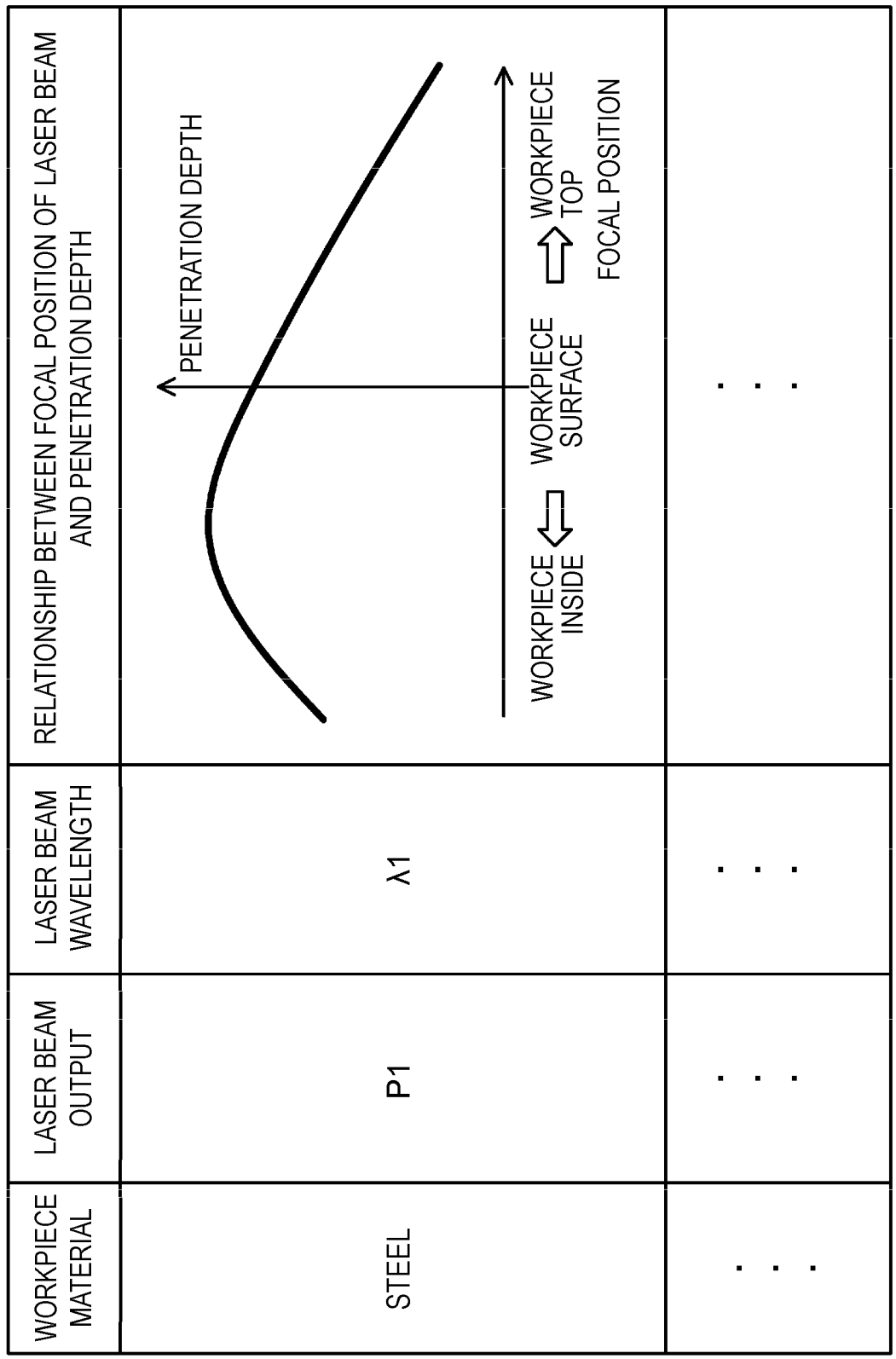
FIG. 4 is a table in which a relationship of the penetration depth of the workpiece with respect to the focal position of the laser beam is associated.

FIGS. 3A and 3B illustrate a relationship between the molten pool and the keyhole formed in the workpiece and the focal position of the laser beam, and FIG. 4 illustrates a table in which a relationship of the penetration depth of the workpiece with respect to the focal position of the laser beam is associated. In FIGS. 3A and 3B, FIG. 3A illustrates a case where the focal point of laser beam LB is located near the surface of workpiece 600, and FIG. 3B illustrates a case where the focal point of laser beam LB is located inside workpiece 600.

In general, when workpiece 600 made of metal is laser-welded, a portion illuminated with laser beam LB is heated to cause weld-penetration, and molten pool 800 is formed, as illustrated in FIG. 3A In the portion illuminated with laser beam LB, a material constituting molten pool 800 intensely evaporates, and by its reaction force, keyhole 810 is formed inside molten pool 800.

When keyhole 810 is formed, most of laser beam LB enters the inside of keyhole 810 while being reflected a plurality of times by the inner wall surface of keyhole 810, and is absorbed by molten pool 800. Repeating the reflection on the inner wall surface of keyhole 810 improves an absorptance at which laser beam LB is absorbed by molten pool 800, thus increasing the amount of heat input to workpiece 600 and increasing the penetration depth. A part of laser beam LB, which varies depending on the material of workpiece 600 or the welding condition and is small in amount, is reflected by a keyhole wall near the entrance of keyhole 810, and the reflected laser beam LB is reflected to the outside without entering keyhole 810, resulting in a loss.

With keyhole 810 being an open space extending from opening 811 of keyhole 810 formed in the surface of molten pool 800 toward the inside of molten pool 800, as illustrated in FIG. 3B, when the focal position of laser beam LB reaches the inside from the surface of workpiece 600, specifically, the inside of keyhole 810, the power density of laser beam LB illuminated on the inner wall surface of keyhole 810 increases, and the amount of light absorbed by molten pool 800 increases, so that the penetration depth can be made deeper than in the case illustrated in FIG. 3A. Further, when the focal position of laser beam LB reaches the inside of keyhole 810, opening 811 of keyhole 810 is expanded more than in the case illustrated in FIG. 3B, and hence laser beam LB more easily reaches the inside of keyhole 810. When the focal position of laser beam LB is located inside from the surface of workpiece 600, laser beam LB converges near opening 811 of keyhole 810 and enters the inner part of keyhole 810. Therefore, laser beam LB is hardly reflected by the keyhole wall near the entrance of keyhole 810, and an increase in the amount of light absorbed by molten pool 800 also leads to an increase in penetration depth.

FIG. 4 illustrates such a relationship in more detail, and the penetration depth of workpiece 600 becomes shallower as the focal position of laser beam LB moves upward with the surface of workpiece 600 as a reference, that is, outward from workpiece 600. On the other hand, the penetration depth of workpiece 600 becomes deeper as the focal position of laser beam LB moves downward with the surface of workpiece 600 as a reference, that is, to a predetermined position inside workpiece 600. This is due to the mechanism described above. When the focal position of laser beam LB moves deeper inside workpiece 600 than the predetermined position, the power density of laser beam LB on the surface of workpiece 600 decreases, and the amount of heat input to workpiece 600 at the initial stage of formation of molten pool 800 decreases. Hence the penetration depth becomes shallower.

In this manner, by moving the focal position of laser beam LB from the surface of workpiece 600 to the predetermined position inside the workpiece so as to reach the inside of keyhole 810, the penetration depth of workpiece 600 can be increased.

The shape of the curve illustrated in FIG. 4 changes depending on the material of workpiece 600 and the output of laser beam LB. Therefore, in storage 210, the penetration depth of workpiece 600 with respect to the focal position of laser beam LB is stored as tabular data in association with the material of workpiece 600, the output of laser beam LB, and the wavelength of laser beam LB. In FIG. 4, the change in penetration depth of workpiece 600 with respect to the focal position of laser beam LB is illustrated in a graph form for easy understanding of the description, but actually, each plot of the curve illustrated in FIG. 4 is associated with the material and the like of workpiece 600 in a data form.

At the time of laser-welding workpiece 600, by changing the focal position of laser beam LB based on the shape of the welded portion in workpiece 600 and the data illustrated in FIG. 4, the laser welding can be appropriately performed in accordance with the shape of the welded portion, and the bonding strength of workpiece 600 can be increased.

Next, an example of the focal position control of laser beam LB when workpiece 600 is actually laser-welded will be described with reference to the drawings.

Figure 5:
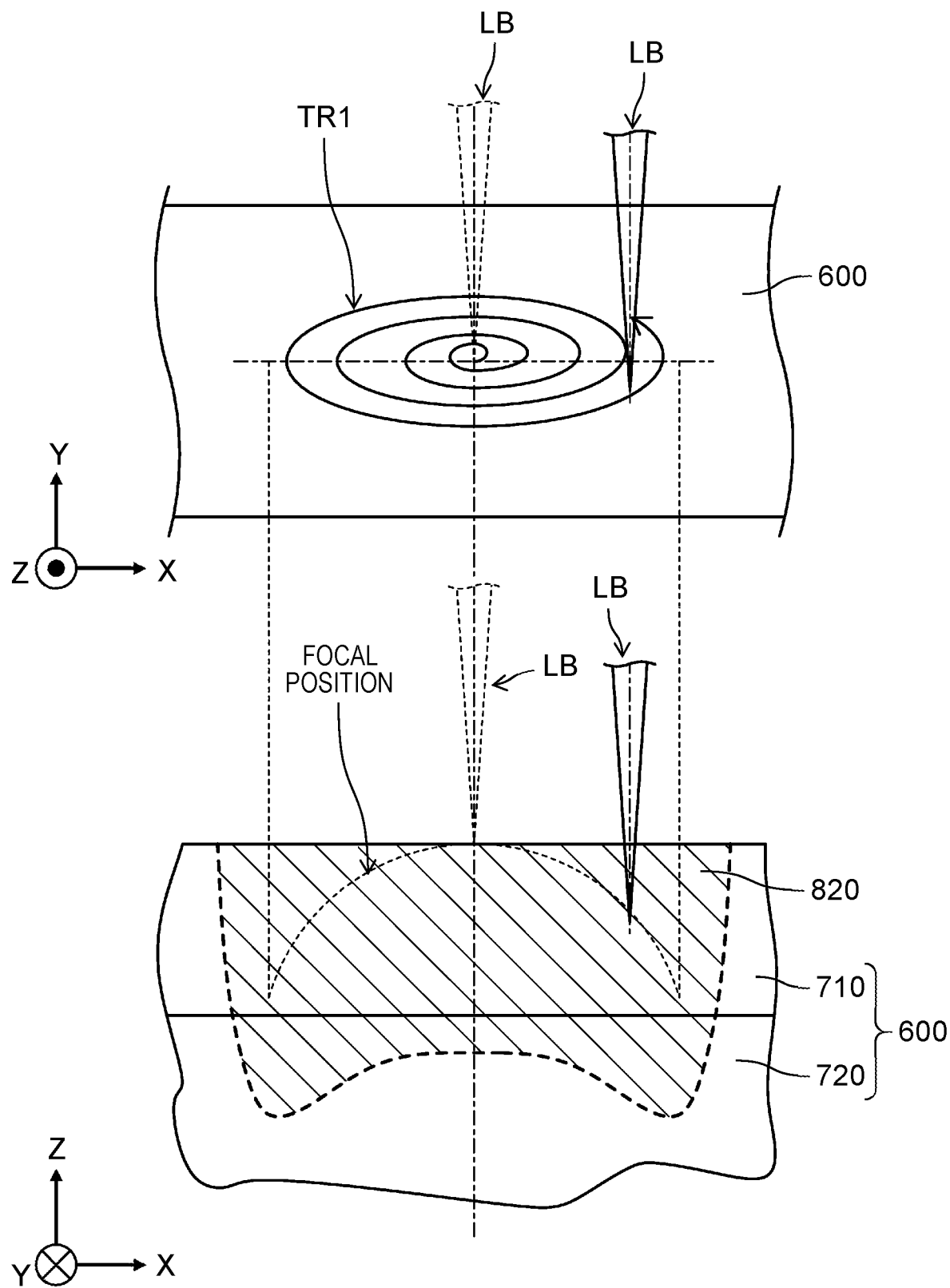
FIG. 5 is a schematic diagram illustrating a relationship among the trajectory of the laser beam illuminated on the workpiece, a depth of a molten region in the workpiece, and the focal position of the laser beam.

FIG. 5 is a schematic diagram illustrating a relationship among the trajectory of the laser beam illuminated on the workpiece, the depth of the molten region in the workpiece, and the focal position of the laser beam. The upper side of FIG. 5 illustrates a view of workpiece 600 as viewed from the surface, and the lower side of FIG. 5 illustrates a cross section of workpiece 600. As illustrated in the lower side of FIG. 5, workpiece 600 is a laminate in which first plate member 710 and second plate member 720 are superimposed on each other, and both first plate member 710 and second plate member 720 are steel sheets. The steel sheets may be steel sheets of different materials or compositions.

Further, as illustrated in the upper side of FIG. 5, laser beam LB is illuminated on the surface of workpiece 600, in this case, the surface of first plate member 710, so as to draw spiral trajectory TR1. In this way, a predetermined welded portion can be uniformly illuminated with laser beam LB. The example illustrated in FIG. 5 corresponds to so-called spot welding.

As illustrated on the lower side of FIG. 5, controller 200 drives focal position adjustment mechanism 407 so that the focal position is deeper inside workpiece 600 toward the peripheral edge of spiral trajectory TR1 than at the center thereof, and workpiece 600 is illuminated with laser beam LB. Accordingly, molten region 820 is deeper toward the peripheral edge than at the center, and specifically, is deeper at the peripheral edge by about several percent to 50% with respect to the center of molten region 820. Molten region 820 corresponds to a portion where molten pool 800 has been cooled and solidified.

In a case where laser welding is performed on a predetermined region in workpiece 600 while laser beam LB is scanned so as to draw a predetermined trajectory after the focal position of laser beam LB is set near the surface of workpiece 600, the amount of heat of molten pool 800 is conducted to workpiece 600 in the periphery of molten pool 800 at the peripheral edge of the trajectory even when the focal position does not deviate from the surface of workpiece 600 at the time of scanning, so that the penetration tends to be shallow. In such a case, workpiece 600 is not sufficiently melted at the peripheral edge of the trajectory, molten region 820 is shallow at the peripheral edge, and the bonding strength between first plate member 710 and second plate member 720 may not satisfy a desired standard.

When the focal position of laser beam LB deviates to the upper side of the surface of workpiece 600 due to the accuracy of workpiece 600 or the like, spatter may occur because the power density of laser beam LB is high at the peripheral edge of the trajectory after molten pool 800 is formed. When such spatter adheres to the surface of workpiece 600, the outer appearance of the welded portion may be impaired, and the welding quality may deteriorate.

On the other hand, according to the present exemplary embodiment, the penetration shape of workpiece 600 and the cross-sectional shape of molten region 820 can be controlled by controlling the focal position of laser beam LB as described above. In the example illustrated in FIG. 5, the peripheral edge of molten region 820 can be made sufficiently deep, and the bonding strength between first plate member 710 and second plate member 720 can be increased. In addition, since the focal position of laser beam LB is changed in a range from the vicinity of the surface of workpiece 600 to the predetermined position inside keyhole 810, a spark as described above is not generated, and the occurrence of spatter is prevented. As a result, the outer appearance of the welded portion is improved, and the welding quality can be improved.

Further, this method can be applied not only to spot welding but also to a case where workpiece 600 is continuously laser-welded along a predetermined direction.

Figure 6:
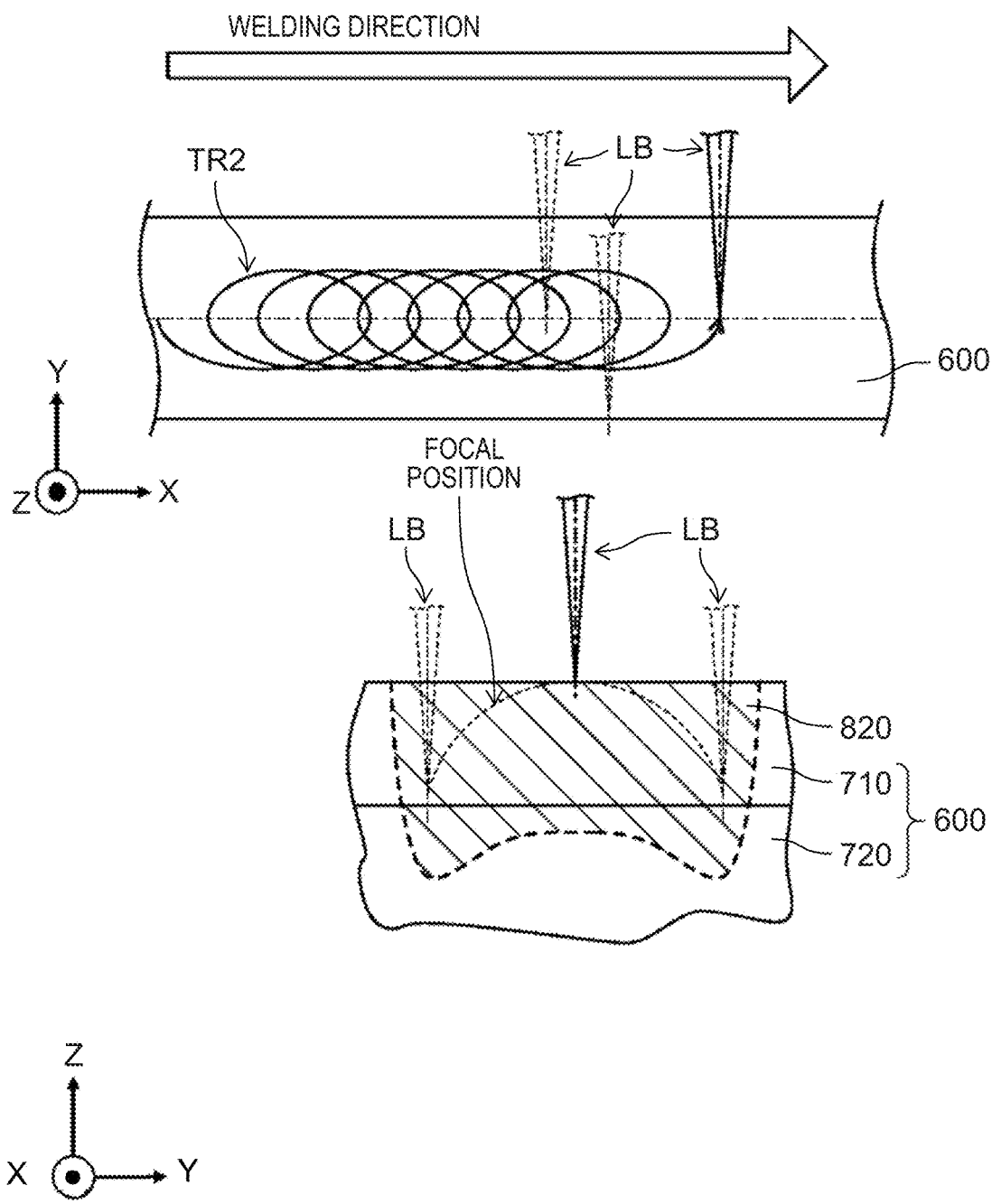
FIG. 6 is another schematic diagram illustrating a relationship among the trajectory of the laser beam illuminated on the workpiece, the depth of the molten region in the workpiece, and the focal position of the laser beam.

FIG. 6 is another schematic diagram illustrating a relationship among the trajectory of the laser beam illuminated on the workpiece, the depth of the molten region in the workpiece, and the focal position of the laser beam. The upper side of FIG. 6 illustrates a view of workpiece 600 viewed from the surface, and the lower side of FIG. 6 illustrates a cross section of workpiece 600. The structure of workpiece 600 and the relationship between the depth of molten region 820 of workpiece 600 and the focal position of laser beam LB are the same as those in the example illustrated in FIG. 5.

FIG. 5 illustrates a case where so-called spot welding is performed, whereas in the example illustrated in FIG. 6, workpiece 600 is continuously laser-welded along a predetermined welding direction while laser beam LB is scanned so as to draw circle trajectory TR2. As a result, a continuous weld bead (not illustrated) is formed on workpiece 600. The continuous weld bead is formed on workpiece 600 by moving the tip of manipulator 500 along a predetermined welding direction in accordance with a control signal from controller 200 while laser beam LB is illuminated from laser beam emitting head 400.

Also, in the case illustrated in FIG. 6, similarly to the case illustrated in FIG. 5, the peripheral edge of molten region 820 of workpiece 600 can be made sufficiently deep, and the bonding strength between first plate member 710 and second plate member 720 can be increased. In addition, the occurrence of spatter as described above can be prevented, and the welding quality can be improved.

In the examples illustrated in FIGS. 5 and 6, laser beam LB is scanned so as to draw spiral trajectory TR1 or circle trajectory TR2 on the surface of workpiece 600, but the present invention is not particularly limited thereto, and laser beam LB may be scanned so as to draw an arc shape or another shape as described above. By illuminating workpiece 600 with laser beam LB so that the focal position is deeper inside workpiece 600 at the peripheral edge of the scanned trajectory than the center thereof, the bonding strength between first plate member 710 and second plate member 720 can be increased. In the following description, each of trajectories of various shapes of laser beam LB scanned on the surface of workpiece 600 may be referred to as a first trajectory.

[Effects and Others]

As described above, the laser machining device according to the present exemplary embodiment at least includes: laser oscillator 100 that generates laser beam LB; optical fiber 300 that transmits laser beam LB generated in laser oscillator 100; laser beam emitting head 400 that is attached to the emission end of optical fiber 300 and emits laser beam LB incident from optical fiber 300 toward workpiece 600; manipulator 500 to which laser beam emitting head 400 is attached, and that moves laser beam emitting head 400 along a predetermined trajectory; and controller 200 that controls laser beam emitting head 400 so as to cause laser beam LB to be scanned two-dimensionally or three-dimensionally on a surface of workpiece 600

Controller 200 controls laser beam emitting head 400 so as to change the focal position of laser beam LB illuminated on workpiece 600 in accordance with the shape of the welded portion in workpiece 600.

In addition, laser beam emitting head 400 includes optical scanning mechanism 424 for scanning laser beam LB and focal position adjustment mechanism 407 for changing the focal position of laser beam LB, and controller 200 controls the operation of optical scanning mechanism 424 and the operation of focal position adjustment mechanism 407.

With laser welding device 1000 configured in this manner, it is possible to control the penetration shape of workpiece 600 and the cross-sectional shape of molten region 820 in accordance with the shape of the welded portion in workpiece 600, and to increase the bonding strength of workpiece 600.

Optical scanning mechanism 424 includes first parallel plate 414 that shifts the optical axis of laser beam LB from a first optical axis to a second optical axis, first servomotor 411 (first drive unit) that rotates first parallel plate 414 about a first rotation axis, second parallel plate 416 that shifts the optical axis of laser beam LB shifted to the second optical axis to a third optical axis, and second servomotor 418 (second drive unit) that rotates second parallel plate 416 about a second rotation axis. The direction of the first rotation axis is the same as the direction of the second rotation axis, and controller 200 controls first servomotor 411 (first drive unit) and second servomotor 418 (second drive unit) so as to rotate first parallel plate 414 and second parallel plate 416 independently or in conjunction with each other, thereby scanning laser beam LB.

With optical scanning mechanism 424 configured in this manner, laser beam LB can be illuminated on the surface of workpiece 600 so as to draw various trajectories. In addition, it is possible to achieve small and lightweight optical scanning mechanism 424 as compared to the case of using a galvanometer as disclosed in Patent Literature 3.

In addition, controller 200 controls focal position adjustment mechanism 407 provided in laser beam emitting head 400 so as to change the focal position of laser beam LB within a range from the surface of workpiece 600 to a predetermined position inside workpiece 600, specifically, a predetermined position inside keyhole 810 formed in workpiece 600.

In this way, the occurrence of spatter during laser welding is prevented. As a result, the outer appearance of the welded portion is improved, and the welding quality can be improved.

Laser welding device 1000 further includes storage 210 that stores data in which the focal position of laser beam LB and the penetration depth of workpiece 600 are associated with the material of workpiece 600, and controller 200 controls laser beam emitting head 400 so as to change the focal position of laser beam LB illuminated on workpiece 600 in accordance with the data and the shape of the welded portion in workpiece 600.

With laser welding device 1000 configured in this manner, the laser welding can be appropriately performed in accordance with the material of workpiece 600 and the shape of the welded portion, the bonding strength of workpiece 600 can be increased, and the welding quality can be improved.

Workpiece 600 is first plate member 710 and second plate member 720 superimposed on each other, and controller 200 controls laser beam emitting head 400 so that laser beam LB draws the first trajectory on the surface of workpiece 600 and controls laser beam emitting head 400 so that the focal position of laser beam LB is deeper inside workpiece 600 at the peripheral edge of the first trajectory than the center thereof.

In this way, laser beam LB can be illuminated in accordance with the size of the welded portion, and the bonding strength between first plate member 710 and second plate member 720 can be increased.

Controller 200 moves manipulator 500, to which laser beam emitting head 400 has been attached, along a predetermined direction while scanning laser beam LB so as to draw the first trajectory.

In this way, a continuous weld bead can be formed on workpiece 600. In addition, the penetration shape of workpiece 600 can be controlled to increase the bonding strength of workpiece 600.

A laser welding method according to the present exemplary embodiment is a laser welding method using laser welding device 1000 and at least includes a laser welding step of emitting laser beam LB toward workpiece 600 while scanning laser beam LB two-dimensionally or three-dimensionally to weld workpiece 600.

In the laser welding step, the focal position of laser beam LB is changed in accordance with the shape of the welded portion in workpiece 600, and molten pool 800 and keyhole 810 are formed in workpiece 600. The focal position of laser beam LB is changed in a range from the surface of workpiece 600 to a predetermined position inside keyhole 810.

In this way, the penetration depth of workpiece 600 can be controlled in accordance with the shape of the welded portion in workpiece 600, and the bonding strength of workpiece 600 can be increased.

In the present exemplary embodiment, the example in which workpiece 600 of the laminate including two plate members 710, 720 superimposed on each other is laser-welded has been described, but the number of superimposed plate members is not particularly limited thereto and may be three or more.

Second Exemplary Embodiment

By using laser welding device 1000 illustrated in the first exemplary embodiment to perform laser welding on workpiece 600 having various structures, it is possible to increase the bonding strength of workpiece 600 at the welded portion.

Figure 7A:
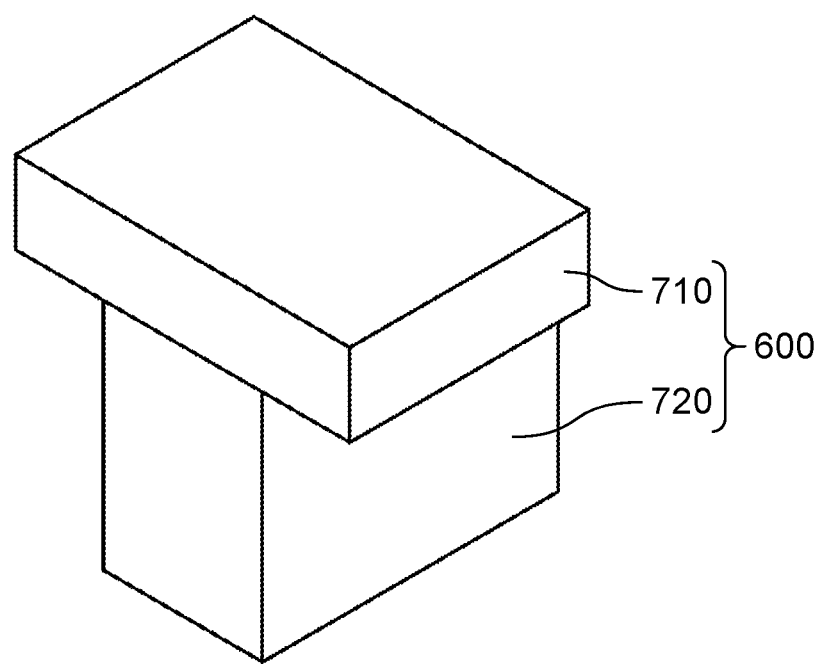
FIG. 7A is a perspective view of a workpiece according to a second exemplary embodiment of the present disclosure.
Figure 7B:
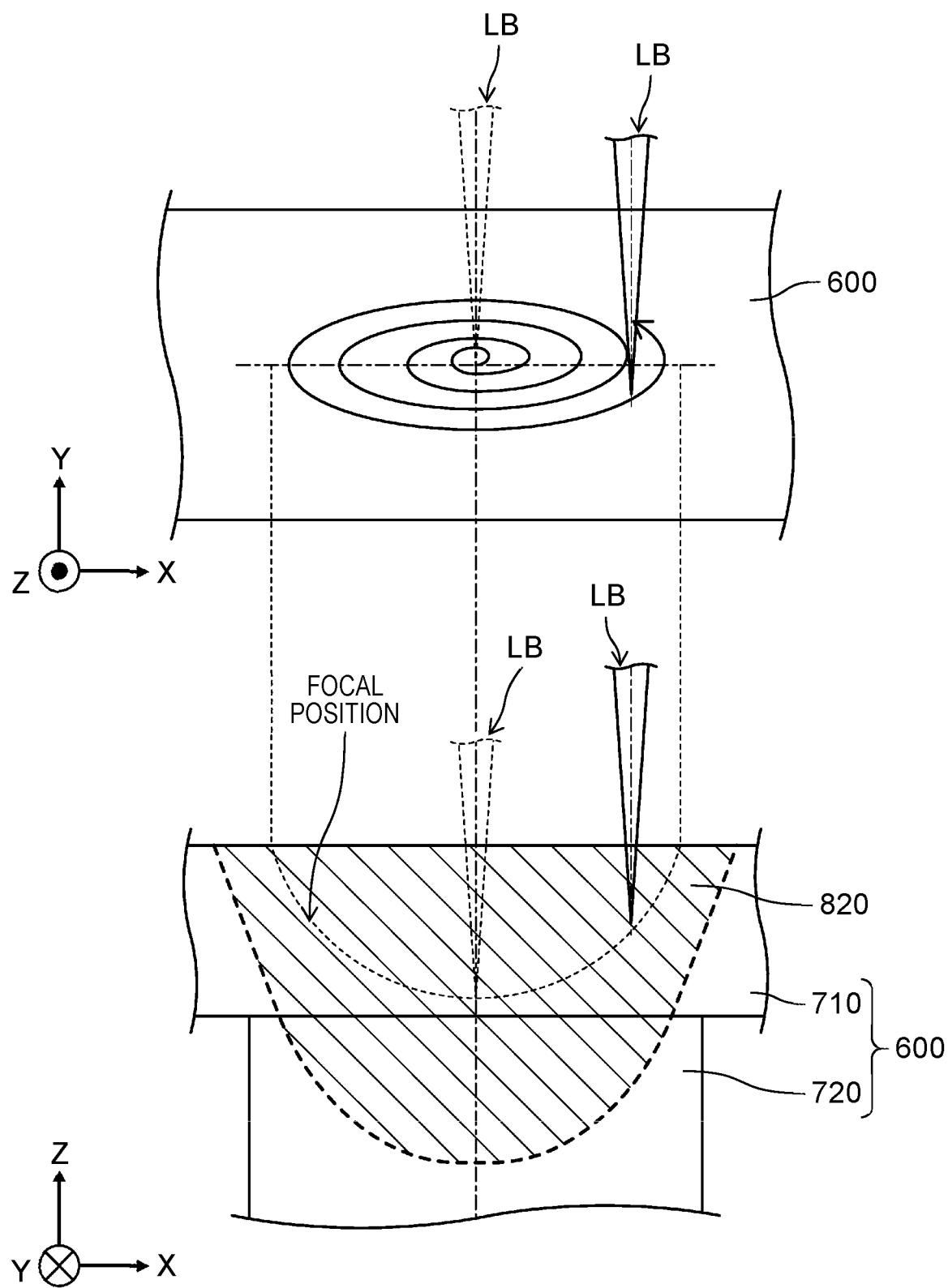
FIG. 7B is a schematic diagram illustrating a relationship among a trajectory of a laser beam illuminated on a workpiece, a depth of a molten region in the workpiece, and a focal position of a laser beam according to the second exemplary embodiment of the present disclosure.

FIG. 7A is a perspective view of a workpiece according to the present exemplary embodiment. That is, the workpiece is a T-shaped joint. FIG. 7B is a schematic diagram illustrating a relationship among the trajectory of the laser beam illuminated on the workpiece, the depth of the molten region in the workpiece, and the focal position of the laser beam. The upper side of FIG. 7B illustrates a view of workpiece 600 as viewed from the surface, and the lower side of FIG. 7B illustrates a cross section of workpiece 600. In FIGS. 7A and 7B, the same parts as those in the first exemplary embodiment are denoted by the same reference numerals, and the detailed description thereof will be omitted.

In the present exemplary embodiment, as illustrated in FIG. 7A, workpiece 600 has a joint shape in which first plate member 710 and second plate member 720 are joined in a T-shape. Similarly to the first exemplary embodiment, first plate member 710 and second plate member 720 are both steel sheets. The steel sheets may be steel sheets of different materials or compositions. First plate member 710 and second plate member 720 may have the same thickness or different thicknesses. At the time of laser-welding workpiece 600 having such a structure, as illustrated in FIG. 7B, controller 200 controls laser beam emitting head 400 so as to illuminate the surface of the joint portion of workpiece 600 with laser beam LB while scanning laser beam LB to draw spiral trajectory TR1.

In this case, unlike the first exemplary embodiment, workpiece 600 is illuminated with laser beam LB so that the focal position is deeper inside workpiece 600 at the center of spiral trajectory TR1 than the peripheral edge thereof. Specifically, the focal position of laser beam LB is changed in accordance with the shape of the joint portion, and laser beam LB is emitted toward workpiece 600 so that the focal position is deeper inside workpiece 600 at the center of the joint portion than the end thereof.

In the T-shaped joint, it may be required to perform welding in the lower plate member, in this case, in the vicinity of the joint portion of second plate member 720 so as not to affect the surface shape thereof as much as possible.

Therefore, in FIG. 7B, the focal position of laser beam LB is made deeper inside workpiece 600 at the center of spiral trajectory TR1 rather than the peripheral edge thereof, whereby it is possible to ensure the bonding strength of workpiece 600 and prevent the surface shape of the lower plate member from being affected.

Although not illustrated, as illustrated in FIG. 6, a continuous weld bead may be formed in the entire joint portion by moving manipulator 500, to which laser beam emitting head 400 has been attached, along the longitudinal direction of the joint portion while scanning laser beam LB so as to draw spiral trajectory TR1. Also, in this case, as in the first exemplary embodiment, the bonding strength is increased, and a weld bead having a good outer appearance can be formed. In addition, the surface shape of the lower material is not affected.

Third Exemplary Embodiment

Figure 8:
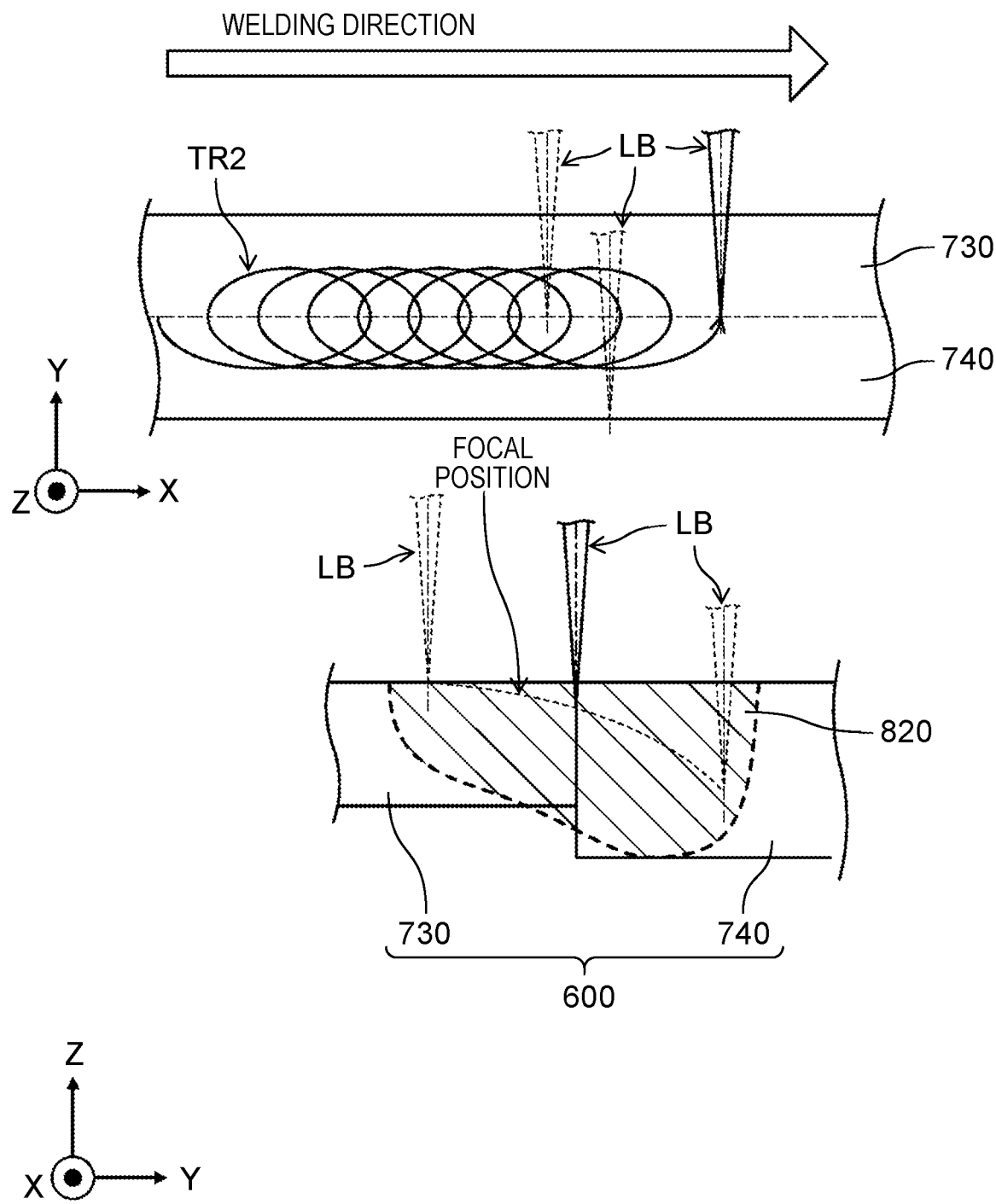
FIG. 8 is a schematic diagram illustrating a relationship among a trajectory of a laser beam illuminated on a workpiece, a depth of a molten region in the workpiece, and a focal position of a laser beam according to a third embodiment of the present disclosure.

FIG. 8 is a schematic diagram illustrating a relationship among the trajectory of the laser beam illuminated on the workpiece, the depth of the molten region in the workpiece, and the focal position of the laser beam according to the present exemplary embodiment. The upper side of FIG. 8 illustrates a view of workpiece 600 as viewed from the surface, and the lower side of FIG. 8 illustrates a cross section of workpiece 600. In FIG. 8, the same parts as those in the first exemplary embodiment are denoted by the same reference numerals, and the detailed description thereof will be omitted.

As illustrated in FIG. 8, workpiece 600 has a butted portion where the end surface of third plate member 730 and the end surface of fourth plate member 740 are butted against each other. In the butted portion, the surface illuminated with laser beam LB may be referred to as the surface. Third plate member 730 and fourth plate member 740 are both steel sheets. The steel sheets may be steel sheets of different materials or compositions. The thickness of fourth plate member 740 is larger than the thickness of third plate member 730. In the butted portion, the surface of third plate member 730 and the surface of fourth plate member 740 are substantially flush with each other.

At the time of laser welding of workpiece 600 having such a structure, as illustrated in FIG. 8, controller 200 controls laser beam emitting head 400 so as to illuminate the surface of the butted portion of workpiece 600 with laser beam LB while scanning laser beam LB to draw circle trajectory TR2.

In this case, controller 200 controls laser beam emitting head 400 so that the focal position becomes deeper inside workpiece 600 as circle trajectory TR2 moves from the peripheral edge on third plate member 730 side to the peripheral edge on fourth plate member 740 side.

In this way, the cross-sectional shape of molten region 820 of workpiece 600 can be controlled without causing burning through, insufficiency in penetration depth, or the like at the butted portion between third plate member 730 and fourth plate member 740 having different plate thicknesses, and the bonding strength of workpiece 600 can be increased.

Fourth Exemplary Embodiment

Figure 9:
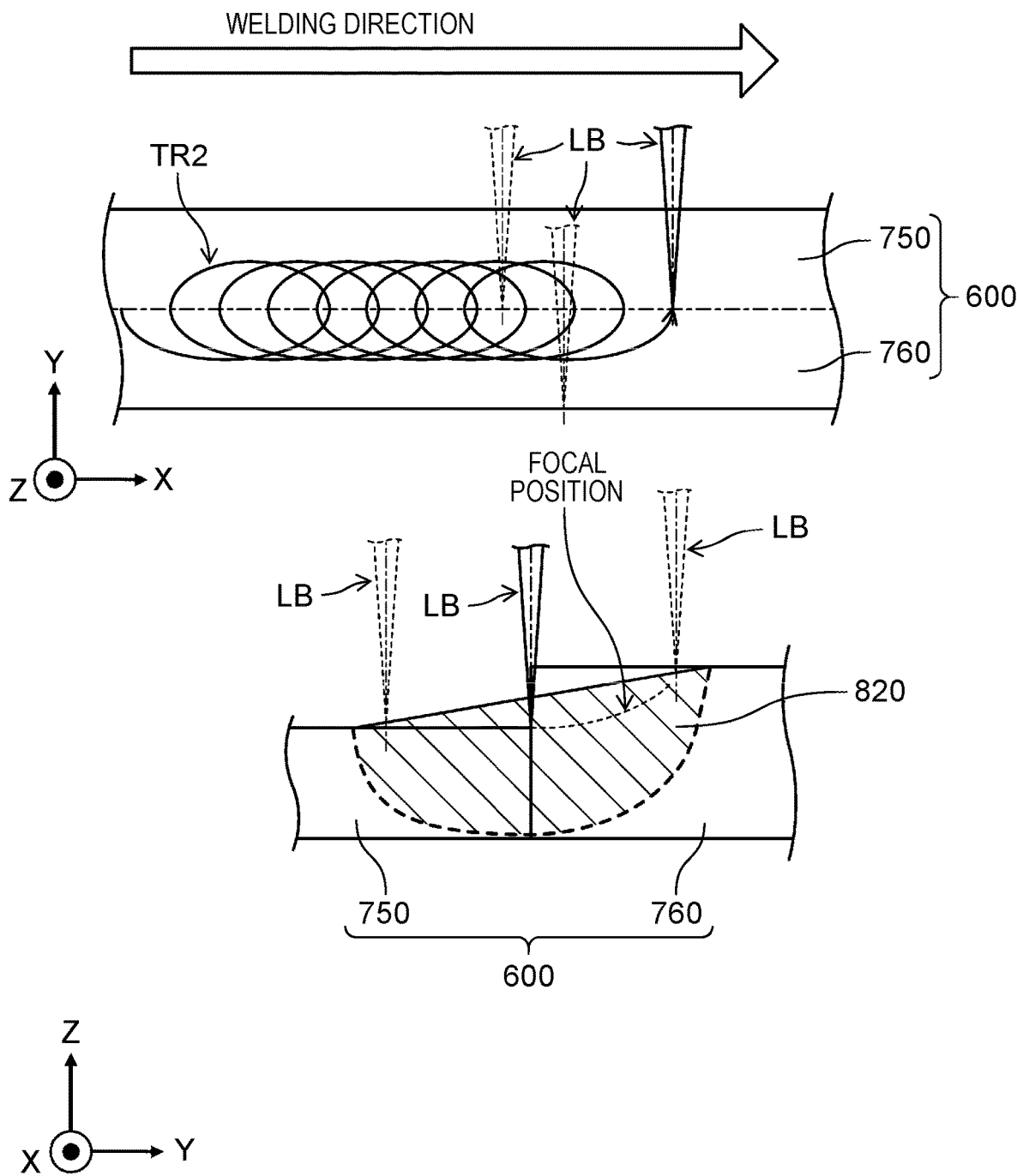
FIG. 9 is a schematic diagram illustrating a relationship among a trajectory of a laser beam illuminated on a workpiece, a depth of a molten region in the workpiece, and a focal position of a laser beam according to a fourth exemplary embodiment of the present disclosure.

FIG. 9 is a schematic diagram illustrating a relationship among the trajectory of the laser beam illuminated on the workpiece, the depth of the molten region in the workpiece, and the focal position of the laser beam according to the present exemplary embodiment. The upper side of FIG. 9 illustrates a view of workpiece 600 as viewed from the surface, and the lower side of FIG. 9 illustrates a cross section of workpiece 600. In FIG. 9, the same parts as those in the first exemplary embodiment are denoted by the same reference numerals, and the detailed description thereof will be omitted.

As illustrated in FIG. 9, workpiece 600 has a butted portion where the end surface of fifth plate member 750 and the end surface of sixth plate member 760 are butted against each other. In the butted portion, the surface illuminated with laser beam LB may be referred to as the surface. Fifth plate member 750 and sixth plate member 760 are both steel sheets. The steel sheets may be steel sheets of different materials or compositions. The thickness of sixth plate member 760 is larger than the thickness of fifth plate member 750. The surface of sixth plate member 760 is located closer to laser beam emitting head 400 than the surface of fifth plate member 750.

At the time of laser welding of workpiece 600 having such a structure, as illustrated in FIG. 9, controller 200 controls laser beam emitting head 400 so as to illuminate the surface of the butted portion of workpiece 600 with laser beam LB while scanning laser beam LB to draw circle trajectory TR2.

In this case, controller 200 controls laser beam emitting head 400 so that the focal position of laser beam LB comes near the surface of fifth plate member 750 until spiral trajectory TR1 moves from the peripheral edge on fifth plate member 750 side to the join of the butted portion.

On the other hand, controller 200 controls laser beam emitting head 400 so that the focal position becomes shallower inside workpiece 600 as circle trajectory TR2 moves from the join of the butted portion to the peripheral edge on sixth plate member 760 side.

In this way, the cross-sectional shape of molten region 820 of workpiece 600 can be controlled without causing burning through, insufficiency in penetration depth, or the like at the butted portion between fifth plate member 750 and sixth plate member 760 having different plate thicknesses, and the bonding strength of workpiece 600 can be increased.

Fifth Exemplary Embodiment

Figure 10:
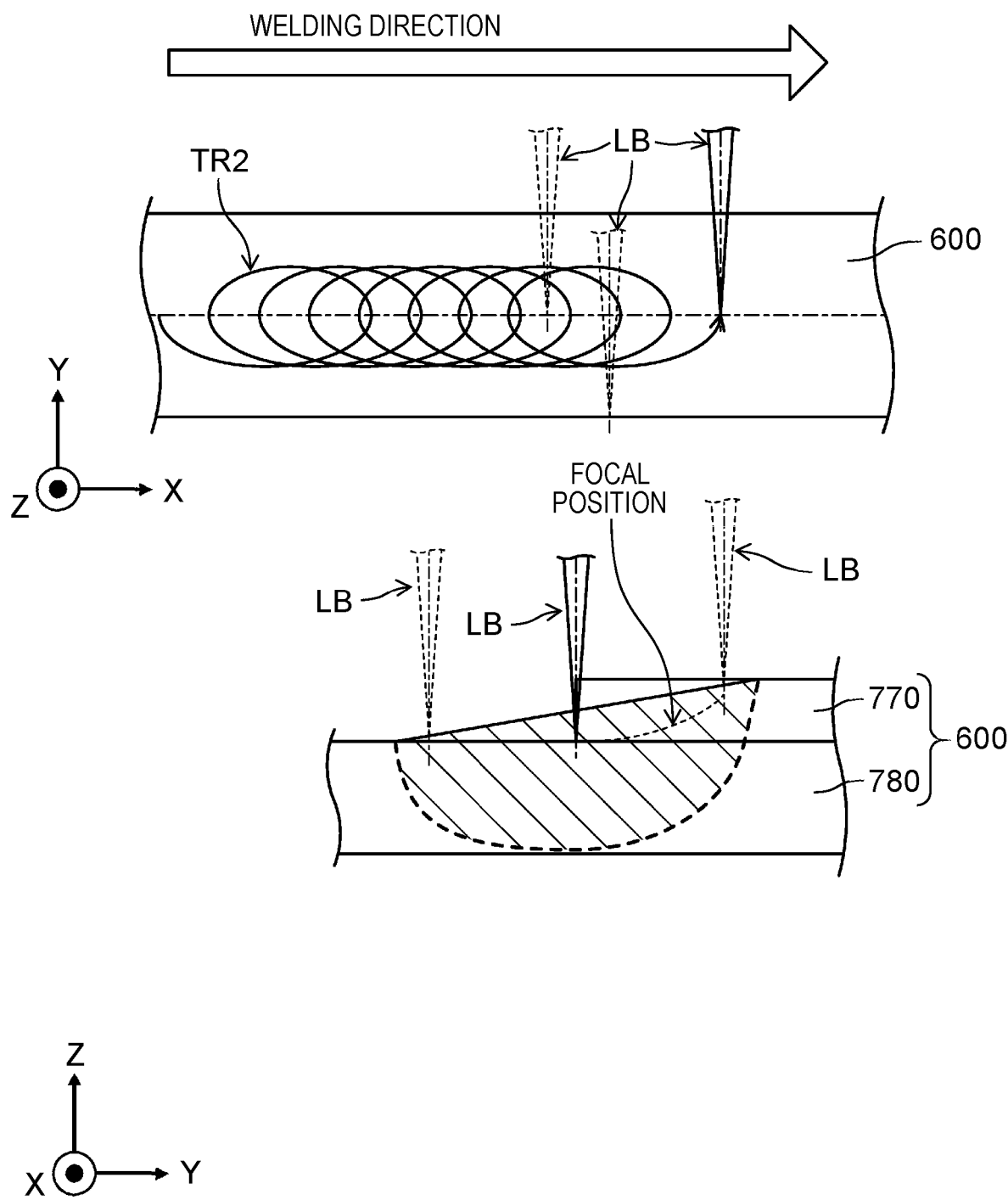
FIG. 10 is a schematic diagram illustrating a relationship among a trajectory of a laser beam illuminated on a workpiece, a depth of a molten region in the workpiece, and a focal position of a laser beam according to a fifth exemplary embodiment of the present disclosure.

FIG. 10 is a schematic diagram illustrating a relationship among the trajectory of the laser beam illuminated on the workpiece, the depth of the molten region in the workpiece, and the focal position of the laser beam according to the present exemplary embodiment. The upper side of FIG. 10 illustrates a view of workpiece 600 as viewed from the surface, and the lower side of FIG. 10 illustrates a cross section of workpiece 600. In FIG. 10, the same parts as those in the first exemplary embodiment are denoted by the same reference numerals, and the detailed description thereof will be omitted.

As illustrated in FIG. 10, workpiece 600 has an overlapped portion in which seventh plate member 770 is overlapped with a part of eighth plate member 780. Seventh plate member 770 and eighth plate member 780 are both steel sheets. The steel sheets may be steel sheets of different materials or compositions. Although the thickness of eighth plate member 780 is drawn to be larger than the thickness of seventh plate member 770, the opposite thicknesses may be applied.

At the time of laser welding of workpiece 600 having such a structure, as illustrated in FIG. 10, controller 200 controls laser beam emitting head 400 so as to illuminate the overlapped portion of workpiece 600 and a predetermined region in the eighth plate member 780 adjacent to the overlapped portion with laser beam LB while scanning laser beam LB to draw circle trajectory TR2.

In this case, controller 200 controls laser beam emitting head 400 so that the focal position of laser beam LB comes near the surface of eighth plate member 780 until circle trajectory TR2 moves from the peripheral edge on eighth plate member 780 side to the end of the overlapped portion.

On the other hand, controller 200 controls laser beam emitting head 400 so that the focal position becomes shallower inside workpiece 600 as circle trajectory TR2 moves from the end of the overlapped portion to the peripheral edge on seventh plate member 770 side.

In this way, in the overlapped portion between seventh plate member 770 and eighth plate member 780, the cross-sectional shape of molten region 820 of workpiece 600 can be controlled without causing burning through, extreme insufficiency in penetration depth in the overlapped portion, or the like, and the bonding strength of workpiece 600 can be increased.

Other Exemplary Embodiments

In the first to fifth exemplary embodiments, the examples have been described in which controller 200 controls the operation of laser beam emitting head 400, specifically, focal position adjustment mechanism 407, in order to change the focal position of laser beam LB. However, the method for changing the focal position of laser beam LB is not particularly limited thereto.

For example, controller 200 may drive manipulator 500 to displace entire laser beam emitting head 400 along the Z-direction, thereby changing the focal position of laser beam LB illuminated on workpiece 600. In this case, the actuator provided in laser beam emitting head 400 can be omitted.

In the second to fifth exemplary embodiments, needless to say, the trajectory is not limited to spiral trajectory TR1 or circle trajectory TR2, and laser beam LB can be scanned so as to draw the above-described various trajectories (first trajectories).

The material of workpiece 600 may be a material except for the steel sheet, for example, a structural material such as an aluminum alloy or a titanium alloy, or an electric material such as copper or an alloy thereof. Workpiece 600 may have a structure in which plate members made of materials different from each other are overlapped. The wavelength and output of laser beam LB are appropriately selected in accordance with the material of workpiece 600, and the control range of the focal position of laser beam LB is appropriately determined in accordance with the shape of the welded portion in workpiece 600 from the data illustrated in FIG. 4.

In the laser welding program, a procedure and a control range for changing the focal position of laser beam LB may be described in association with the material of workpiece 600 and the shape of the welded portion in workpiece 600. In that case, the data illustrated in FIG. 5 may not be separately stored in storage 210.

The mechanism for scanning laser beam LB is not particularly limited to the configuration illustrated in FIG. 2 and may have another configuration. For example, laser beam LB may be scanned using a conventional three-axis galvanometer scanner.

INDUSTRIAL APPLICABILITY

The laser welding device of the present disclosure can control the penetration shape in accordance with the shape of the welded portion in the workpiece and is thus useful for machining workpieces having various materials or shapes.

REFERENCE MARKS IN THE DRAWINGS 100 laser oscillator
200 controller
210 storage
300 optical fiber
400 laser beam emitting head
404 collimating lens
405 condensing lens
406 slider
407 focal position adjustment mechanism
411 first servomotor (first drive unit)
412 first timing belt (first rotation member)
413 first timing belt pulley (first transmission member)
414 first parallel plate
416 second parallel plate
417 second timing belt pulley (second transmission member)
418 second servomotor (second drive unit)
419 second timing belt (second rotation member)
420 first rotation mechanism
421 second rotation mechanism
422 first optical unit
423 second optical unit
424 optical scanning mechanism
500 manipulator
600 workpiece
710 to 780 first to eighth plate members
800 molten pool
810 keyhole
820 molten region
1000 laser welding device
LB laser beam
TR1 spiral trajectory

The invention claimed is:

1. A laser welding device at least comprising:
a laser oscillator that generates a laser beam;
an optical fiber that transmits the laser beam generated in the laser oscillator;
a laser beam emitting head that is attached to an emission end of the optical fiber and emits the laser beam incident from the optical fiber toward a workpiece;
a manipulator that the laser beam emitting head is attached to and that moves the laser beam emitting head along a predetermined trajectory; and
a controller that controls the laser beam emitting head so as to cause the laser beam to be scanned two-dimensionally or three-dimensionally on a surface of the workpiece,
the controller controls the laser beam emitting head or the manipulator so as to change a focal position of the laser beam illuminated on the workpiece in accordance with a shape of a welded portion in the workpiece, wherein
the workpiece is a plurality of plate members superimposed on each other, and
the controller controls the laser beam emitting head so as to cause the laser beam to draw a spiral trajectory on the surface of the workpiece, and controls the laser beam emitting head or the manipulator so as to make the focal position of the laser beam deeper inside the workpiece toward a peripheral edge of the spiral trajectory than a center of the spiral trajectory.

2. The laser welding device according to claim 1, further comprising a storage that stores data including the focal position of the laser beam and a penetration depth of the workpiece associated with a material of the workpiece, wherein the controller controls the laser beam emitting head or the manipulator so as to change the focal position of the laser beam illuminated on the workpiece in accordance with the shape of the welded portion in the workpiece and the data.

3. The laser welding device according to claim 1, wherein the laser beam emitting head at least includes a focal position adjustment mechanism for changing the focal position of the laser beam, and the controller controls an operation of the focal position adjustment mechanism.

4. The laser welding device according to claim 1, wherein the controller drives the manipulator to displace the laser beam emitting head along a direction parallel to an optical axis of the laser beam illuminated from the laser beam emitting head and change the focal position of the laser beam illuminated on the workpiece.

5. The laser welding device according to claim 1, wherein the laser beam emitting head further includes an optical scanning mechanism for scanning the laser beam, and the controller controls an operation of the optical scanning mechanism.

6. The laser welding device according to claim 1, wherein the controller controls the laser beam emitting head or the manipulator so as to change the focal position of the laser beam within a range from a surface of the workpiece to a predetermined position inside the workpiece.

7. The laser welding device according to claim 1, wherein the controller controls the laser beam emitting head so as to cause the laser beam to draw a predetermined first trajectory on the surface of the workpiece, and controls the laser beam emitting head or the manipulator so as to make the focal position of the laser beam deeper inside the workpiece toward a peripheral edge of the first trajectory than at a center of the first trajectory.

8. The laser welding device according to claim 1, wherein the controller moves the manipulator that the laser beam emitting head is attached to along a predetermined direction while scanning the laser beam so as to draw the spiral trajectory.

9. A laser welding method using the laser welding device according to claim 1, the method at least comprising:

a laser welding step of emitting the laser beam toward the workpiece while scanning the laser beam two-dimensionally or three-dimensionally to weld the workpiece, wherein in the laser welding step, the focal position of the laser beam is changed in accordance with the shape of the welded portion in the workpiece, and a molten pool and a keyhole are formed in the workpiece.

10. The laser welding method according to claim 9, wherein in the laser welding step, the focal position of the laser beam is changed in a range from a surface of the workpiece to a predetermined position inside the keyhole.

11. A laser welding device at least comprising:

a laser oscillator that generates a laser beam;

an optical fiber that transmits the laser beam generated in the laser oscillator;

a laser beam emitting head that is attached to an emission end of the optical fiber and emits the laser beam incident from the optical fiber toward a workpiece;

a manipulator that the laser beam emitting head is attached to and that moves the laser beam emitting head along a predetermined trajectory; and a controller that controls the laser beam emitting head so as to cause the laser beam to be scanned two-dimensionally or three-dimensionally on a surface of the workpiece, the controller controls the laser beam emitting head or the manipulator so as to change a focal position of the laser beam illuminated on the workpiece in accordance with a shape of a welded portion in the workpiece, wherein the workpiece has a joint portion with two plate members joined in a T-shape, and the controller controls the laser beam emitting head so as to cause the laser beam to draw a predetermined first trajectory on a surface of the joint portion in the workpiece, and controls the laser beam emitting head or the manipulator so as to make the focal position of the laser beam deeper inside the workpiece at a center of the joint portion than an end of the joint portion.

12. A laser welding device at least comprising:

a laser oscillator that generates a laser beam;

an optical fiber that transmits the laser beam generated in the laser oscillator;

a laser beam emitting head that is attached to an emission end of the optical fiber and emits the laser beam incident from the optical fiber toward a workpiece;

a manipulator that the laser beam emitting head is attached to and that moves the laser beam emitting head along a predetermined trajectory; and a controller that controls the laser beam emitting head so as to cause the laser beam to be scanned two-dimensionally or three-dimensionally on a surface of the workpiece, the controller controls the laser beam emitting head or the manipulator so as to change a focal position of the laser beam illuminated on the workpiece in accordance with a shape of a welded portion in the workpiece, wherein the workpiece includes a third plate member and a fourth plate member butted against each other, the fourth plate member being thicker than the third plate member, and a surface of the third plate member and a surface of the fourth plate member are substantially flush with each other at a butted portion, and the controller controls the laser beam emitting head so as to cause the laser beam to draw a predetermined first trajectory on a surface of the butted portion, and controls the laser beam emitting head or the manipulator so as to make the focal position of the laser beam deeper inside the workpiece as the first trajectory moves from the third plate member side to the fourth plate member side.

13. A laser welding device at least comprising:

a laser oscillator that generates a laser beam;

an optical fiber that transmits the laser beam generated in the laser oscillator;

a laser beam emitting head that is attached to an emission end of the optical fiber and emits the laser beam incident from the optical fiber toward a workpiece;

a manipulator that the laser beam emitting head is attached to and that moves the laser beam emitting head along a predetermined trajectory; and a controller that controls the laser beam emitting head so as to cause the laser beam to be scanned two-dimensionally or three-dimensionally on a surface of the workpiece, the controller controls the laser beam emitting head or the manipulator so as to change a focal position of the laser beam illuminated on the workpiece in accordance with a shape of a welded portion in the workpiece, wherein the workpiece includes a fifth plate member and a sixth plate member butted against each other, the sixth plate member being thicker than the fifth plate member, and a surface of the sixth plate member is located closer to the laser beam emitting head than a surface of the fifth plate member at a butted portion, and the controller controls the laser beam emitting head so as to cause the laser beam to draw a predetermined first trajectory on the surface of the butted portion, and controls the laser beam emitting head or the manipulator so as to make the focal position of the laser beam near the surface of the fifth plate member until the first trajectory moves from a peripheral edge on the fifth plate member side to a join of the butted portion, and so as to make the focal position of the laser beam shallower inside the workpiece as the first trajectory moves from the join of the butted portion to a peripheral edge on the sixth plate member side.

14. A laser welding device at least comprising:

a laser oscillator that generates a laser beam;

an optical fiber that transmits the laser beam generated in the laser oscillator;

a laser beam emitting head that is attached to an emission end of the optical fiber and emits the laser beam incident from the optical fiber toward a workpiece;

a manipulator that the laser beam emitting head is attached to and that moves the laser beam emitting head along a predetermined trajectory; and a controller that controls the laser beam emitting head so as to cause the laser beam to be scanned two-dimensionally or three-dimensionally on a surface of the workpiece, the controller controls the laser beam emitting head or the manipulator so as to change a focal position of the laser beam illuminated on the workpiece in accordance with a shape of a welded portion in the workpiece, wherein the workpiece has an overlapped portion with a seventh plate member overlapped on a part of an eighth plate member, the seventh plate member being thinner than the eighth plate member, and the controller controls the laser beam emitting head so as to cause the laser beam to draw a predetermined first trajectory from the overlapped portion to a surface of the eighth plate member, and controls the laser beam emitting head or the manipulator so as to make the focal position of the laser beam near the surface of the eighth plate member until the first trajectory moves from a peripheral edge on the eighth plate member side to an end of the overlapped portion, and make the focal position of the laser beam shallower inside the workpiece as the first trajectory moves from the end of the overlapped portion to a peripheral edge on the seventh plate member side.

\* \* \* \* \*